US009711059B2

(12) United States Patent
Rheiner et al.

(10) Patent No.: US 9,711,059 B2
(45) Date of Patent: Jul. 18, 2017

(54) MOTION PLATFORM DEVICE FOR FLIGHT SIMULATION

(71) Applicant: SOMNIACS AG, Zurich (CH)

(72) Inventors: Max Rheiner, Zürich (CH); Thomas Tobler, Zürich (CH); Fabian Troxler, Zürich (CH)

(73) Assignee: SOMNIACS AG, Zurich (CH)

( * ) Notice: Subject to any disclaimer, the term of this patent is extended or adjusted under 35 U.S.C. 154(b) by 287 days.

(21) Appl. No.: 14/671,124

(22) Filed: Mar. 27, 2015

(65) Prior Publication Data
US 2016/0284226 A1   Sep. 29, 2016

(51) Int. Cl.
*G09B 9/08* (2006.01)
*G09B 9/00* (2006.01)

(52) U.S. Cl.
CPC .............. *G09B 9/08* (2013.01); *G09B 9/00* (2013.01); *G09B 9/085* (2013.01)

(58) Field of Classification Search
CPC .. G09B 9/00; G09B 9/08; G09B 9/085; A63B 22/0076; A63B 22/0087; A63B 22/0605; A63B 21/00061; A63B 2220/30; A63B 2220/40; A63B 2220/80; A63B 2220/803; A63B 2024/0096
See application file for complete search history.

(56) References Cited

U.S. PATENT DOCUMENTS

| 5,490,784 A | * | 2/1996 | Carmein | A63B 22/02 434/29 |
| 5,792,031 A | * | 8/1998 | Alton | A63B 69/0059 482/78 |
| 2002/0115043 A1 | * | 8/2002 | Baker | G09B 19/16 434/30 |
| 2005/0277092 A1 | | 12/2005 | Hwang | |
| 2006/0046230 A1 | * | 3/2006 | MacDonald | G09B 9/08 434/55 |
| 2014/0274564 A1 | | 9/2014 | Greenbaum | |

FOREIGN PATENT DOCUMENTS

EP   2626848 A1   8/2013
WS   2006119979 A1   11/2006

* cited by examiner

*Primary Examiner* — Timothy A Musselman
(74) *Attorney, Agent, or Firm* — Browdy and Neimark, PLLC

(57) ABSTRACT

A motion platform device for flight simulation comprises: a base frame, a moving platform, which is spaced apart from said base frame and which has a user position surface opposing to the base frame, and a number of mounts connected to the base frame and connected with the moving platform, wherein the mounts are adapted to allow a relative movement of the user position surface, especially pivoting around a central point in three directions. The user is lying on the surface and actuates the flying movement through lateral inner wings and/or lateral outer wings.

10 Claims, 10 Drawing Sheets

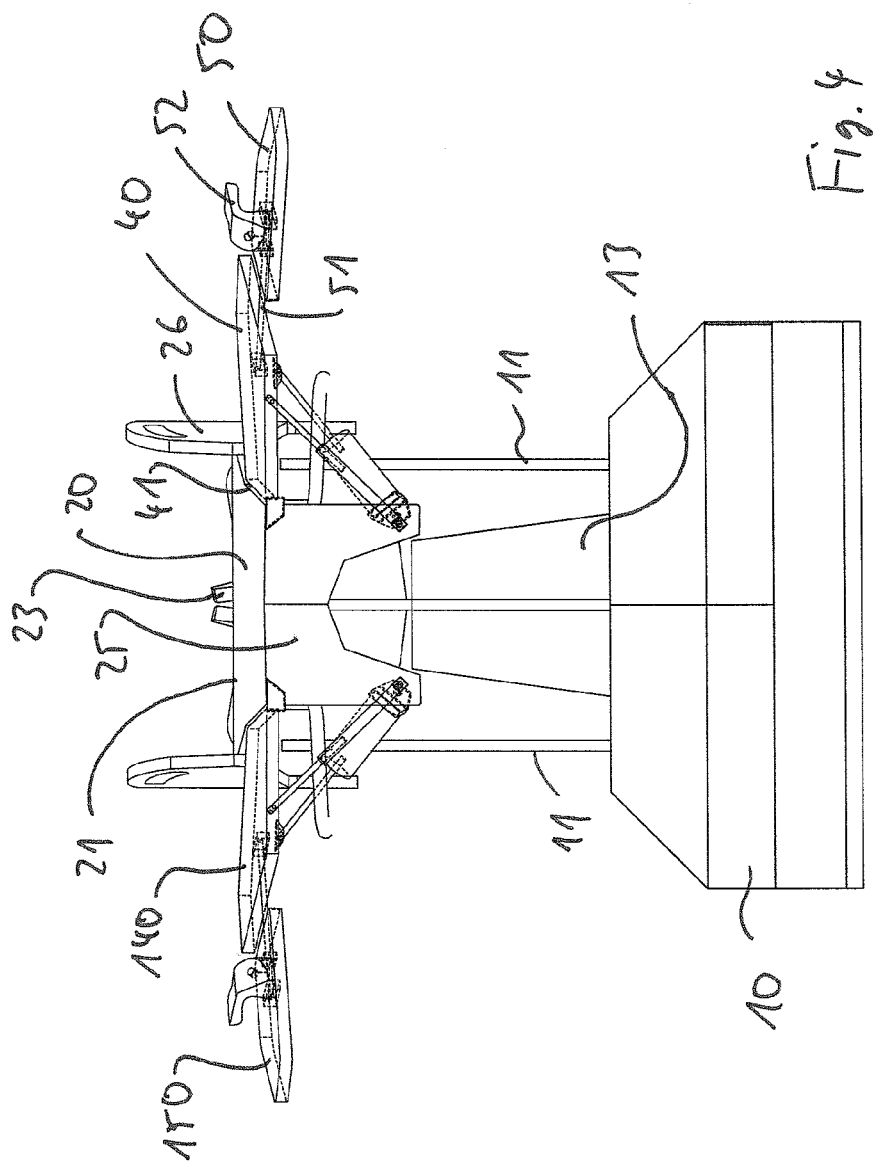

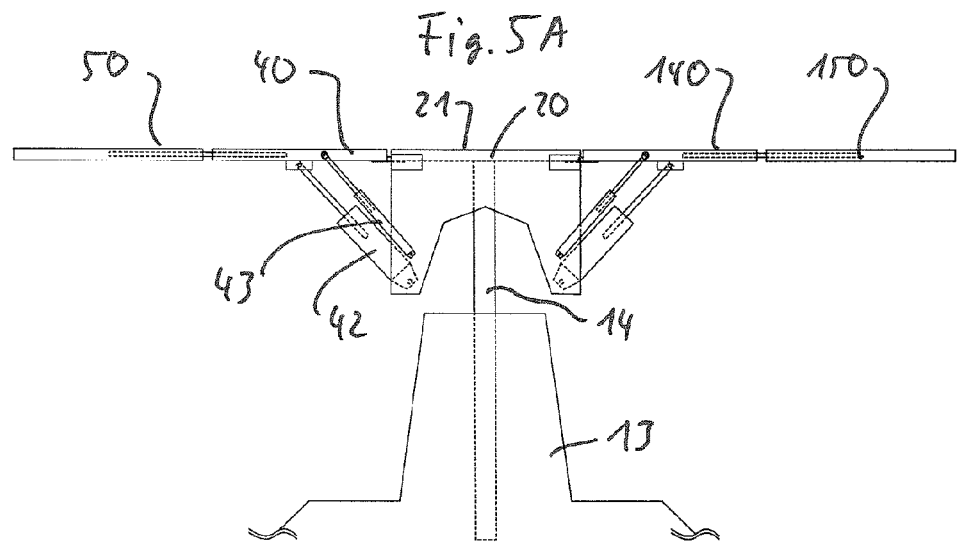
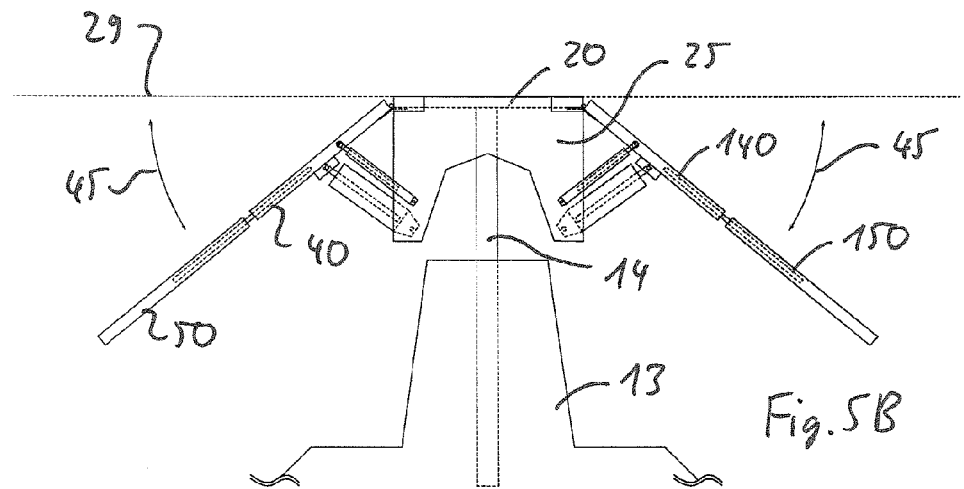
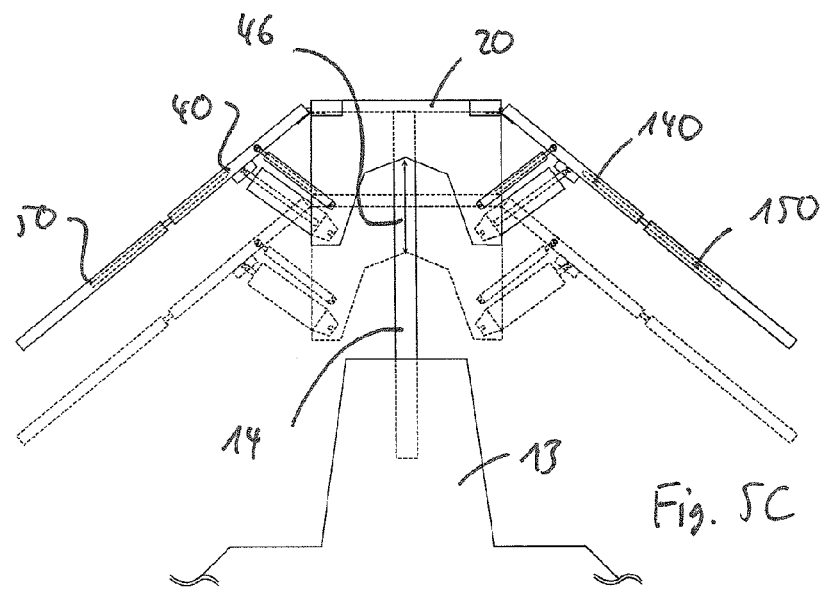

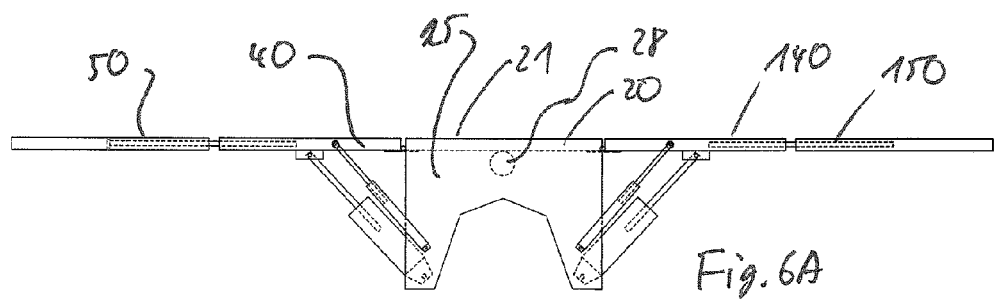
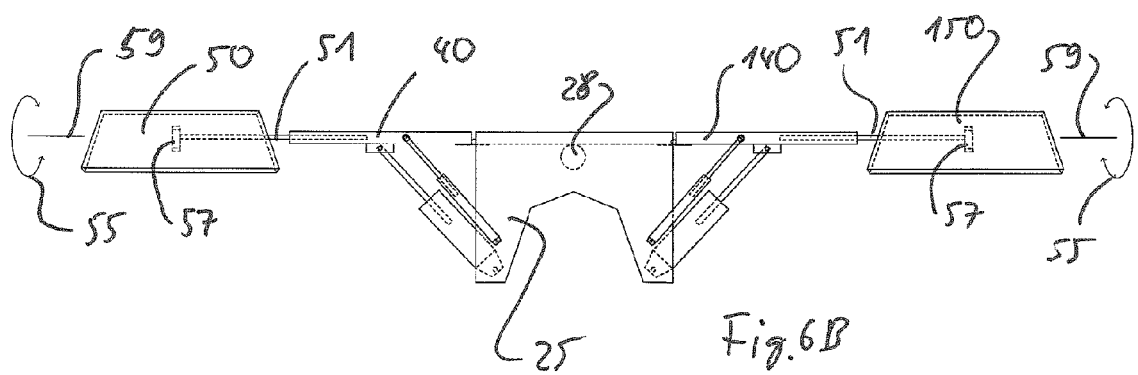

MOTION PLATFORM DEVICE FOR FLIGHT SIMULATION

TECHNICAL FIELD

The present invention relates to motion platform device for flight simulation, comprising: a base frame, a moving platform, which is spaced apart from said base frame and which has a user position surface opposing to the base frame, and a number of mounts connected to the base frame and connected with the moving platform, wherein the mounts are adapted to allow a relative movement of the user position surface.

PRIOR ART

A motion platform device including a moving platform which is coupled to a base platform by three pedestals and three linkages is known form US 2005/0277092. Three actuators are disposed on the base platform and are synchronously movable relative to the base platform along three linear sliding paths, and are connected respectively to the pedestals. The linkages are linked with the moving platform and are respectively coupled to the pedestals so as to transmit movement of the actuators to turn the moving platform. The linkages are controlled by a simulated movement controller to be moved relative to the pedestals along the respective lengths so as to perform flight motion simulation, particularly in spatial disorientation training. This three-leg six DOF linear motor based parallel manipulator has been proved to be excellent in simulation performance, especially in the working space.

A device for the three-dimensional movement of a person is known from WO 2006/119979. This document shows a suspension device for picking up a person. A counterforce is coupled to the suspension device and a movement device is connected to the suspension device. The movement device is actuated by the persons own muscular power, and connected to the suspension device in such a way that the person situated in the suspension device, by actuating the movement device by lateral lifting and lowering of his arms, executes a movement, which is similar to bird flight, upwards counter to the force of gravity.

EP 2 626 848 provides a flight simulator device having an input unit with a person receptacle for receiving a person, and an omnidirectional movable support vehicle with multiple wheels and drives for driving the wheels. A control device is connected with the input units and the drives of the support vehicle for controlling the drives of the support vehicle on the basis of signals originating from the input units.

A further simulation platform is known from US 2014/0274564 with a variable resistance exercise device operatively coupled to a virtual reality environment rendered by a computer such that user exercise motion on the variable resistance exercise device translates to movement of an avatar representing the user in the virtual reality environment and wherein the virtual reality environment has collision objects capable of a collision with the avatar representing the user in the virtual environment, and wherein the collision of a collision object with the avatar representing the user in the virtual environment causes the resistance level of the user's variable resistance exercise device to change.

SUMMARY OF THE INVENTION

The prior art discloses flight simulators with an embedded user on one side. Furthermore, the prior art discloses a harness attached by ropes allowing to support a body of a user hanging in the harness for simulating a bird's flight through the free attachment of the body of the user.

However, these solutions cannot provide the user with an improved impression of a flight, not alone and not in combination.

Therefore the invention provides a motion platform device for flight simulation, comprising: a base frame, a moving platform, which is spaced apart from said base frame and which has a user position surface opposing to the base frame, and a number of mounts connected to the base frame and connected with the moving platform, wherein the mounts are adapted to allow a relative pivotal movement of the user position surface around a central point, being especially a spherical joint. The user position surface of the moving platform comprises a central chest rest, fixedly connected with an angle with a thigh rest, e.g. between 30 and 45 degrees, wherein the thigh rest is connected with a central leg separator supporting two outer footrests to position the feet of the user.

The two inner lateral wings are pivotally connected on both sides of the chest rest and an outer lateral wing is pivotally connected with each inner lateral wing on its opposite side of the chest rest, wherein each outer lateral wing comprises a hand reception on its upper side.

Such a platform can further comprise a fan, attached at and in front of the moving platform and adapted to direct a stream of air towards the head of a user positioned on the moving platform. The fan action can be controlled in view of the simulated speed as calculated and shown on a display.

The platform device can have outer lateral wings further comprising one or more actuation buttons for the thumb and/or the fingers of the hand of a user on the wing or at the hand reception.

The pivot axes of the platform device between the inner wings and the chest rest can be oriented in or near the plane of the chest rest, wherein the pivot axes between the outer wings and the inner wings can be oriented perpendicular to the respective pivot axes between the inner wings and the chest rest.

The mounts can be connected to actuators adapted to pivot the moving platform around a spherical joint provided under the chest rest between the chest rest and the thigh rest.

The inner wings and the respective outer wings are preferably connected with a resetting spring or resetting actuator attached at opposite wing surfaces, bringing the upper surfaces of the inner and outer wings in flush alignment, if no external force is acting on the pivotal joint.

The same concept can be applied to the connection between inner wings and the chest rest which can be connected with a resetting spring or resetting actuator, bringing the upper surfaces of the inner wings and the chest rest in flush alignment, if no external force is acting on the pivotal joint.

In order to provide direct feedback first sensors are preferably provided between the inner wings and the chest rest detecting the relative pivotal position between the respective inner wings and the chest rest; second sensors are preferably provided between the inner wings and the connected outer wings detecting the relative pivotal position between the respective inner wings and outer wings, and finally third sensors are preferably provided between the base frame and the moving platform detecting the relative pivotal position between the base frame and the moving platform. Instead of physical sensors it is of course also possible to calculate the position of the moving platform or the wings from the motor position of the drives actuating the struts.

Then, with these sensors provided, an electronic control unit can be used, e.g. hidden in the base frame, adapted to receive sensor signals from said first, second and third sensors to determine the position of the different part of the moving platform above the base frame. The control unit, usually a programmable computer having a processor, memory and input means, is further adapted to calculate the position of the moving platform in a virtual environment and generating a virtual image to be represented on a screen of a display to be seen or worn by a user.

Sensor signals from a pivotal movement of one or both outer wings in relation to the respective inner wings, and sensor signals from the pivotal movement of the inner wings in relation to the chest rest, can be used by the computer of the control unit to change acceleration, orientation and position of the simulated flight through change of the virtual represented image and determining the corrected orientation and position of the moving platform through actuating the actuators.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 4 shows a front view on the embodiment of the motion platform device according to FIG. 1, FIG. 5A-5C show three schematical views of the inner and outer wings in a forward flying simulation movement with a heave effect, FIG. 6A-6B show two schematical views of the inner and outer wings in an descending flying simulation movement.

DESCRIPTION OF PREFERRED EMBODIMENTS

Figure 1:
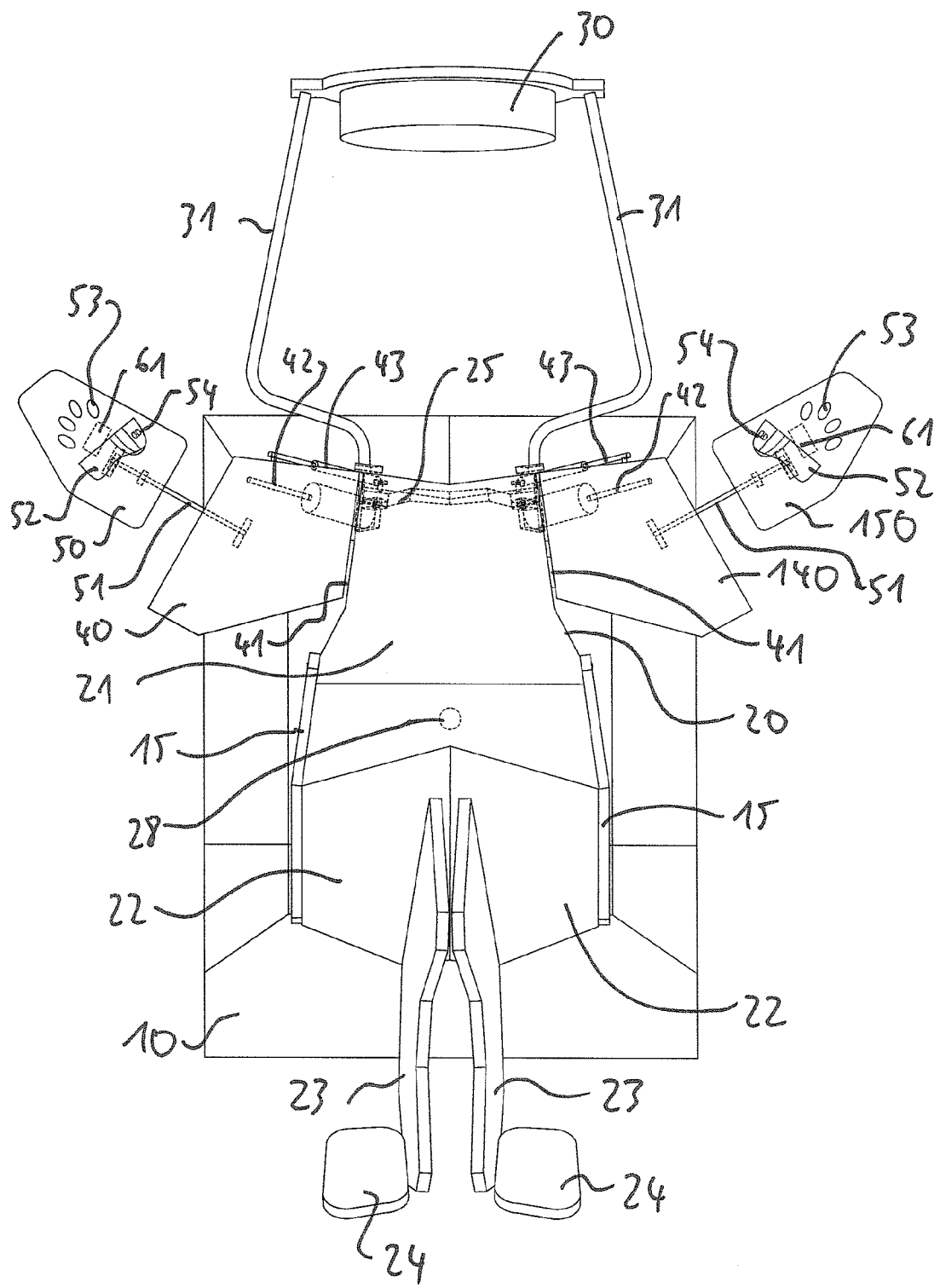
FIG. 1 shows a view from above on an embodiment of the motion platform device according to an embodiment of the invention.
Figure 2:
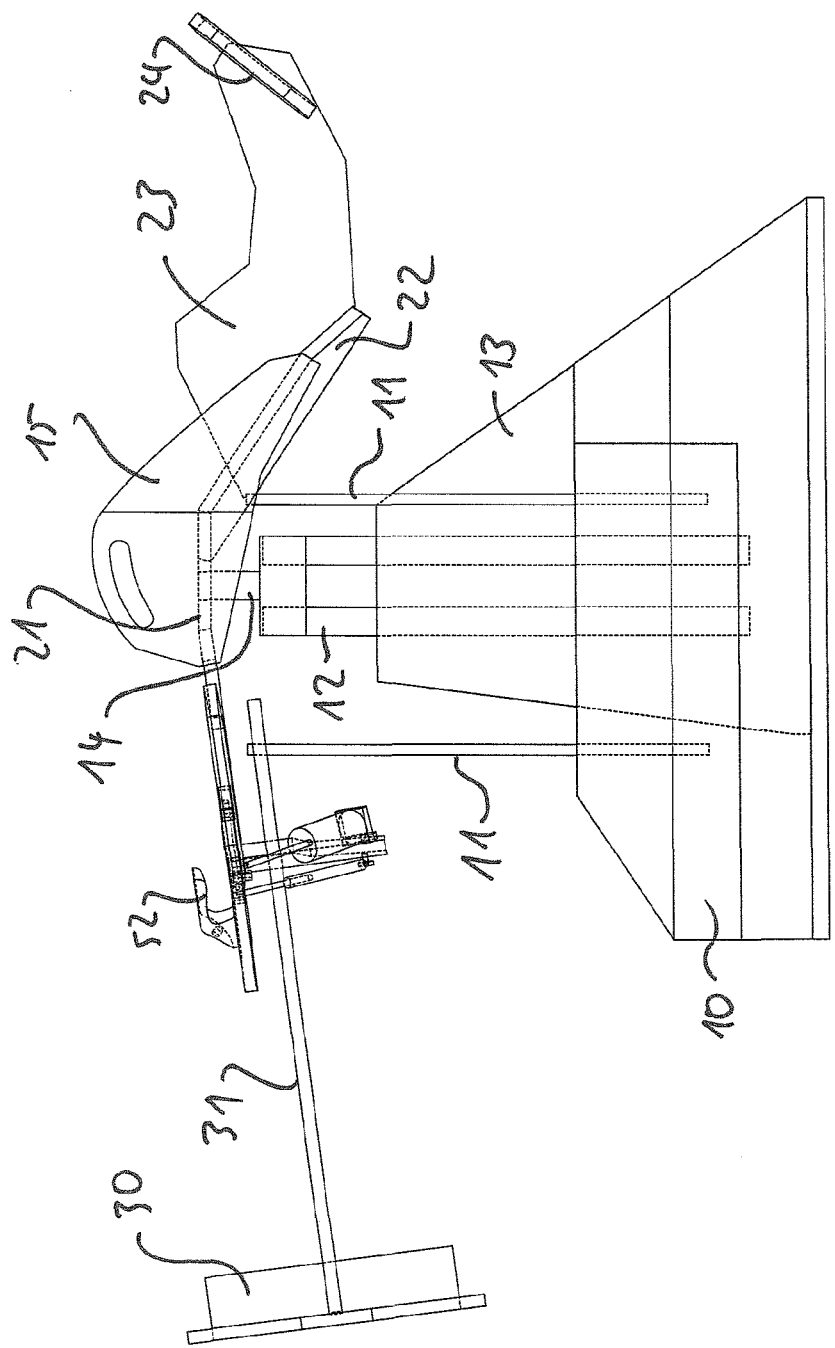
FIG. 2 shows a side view on the embodiment of the motion platform device according to FIG. 1.
Figure 3:
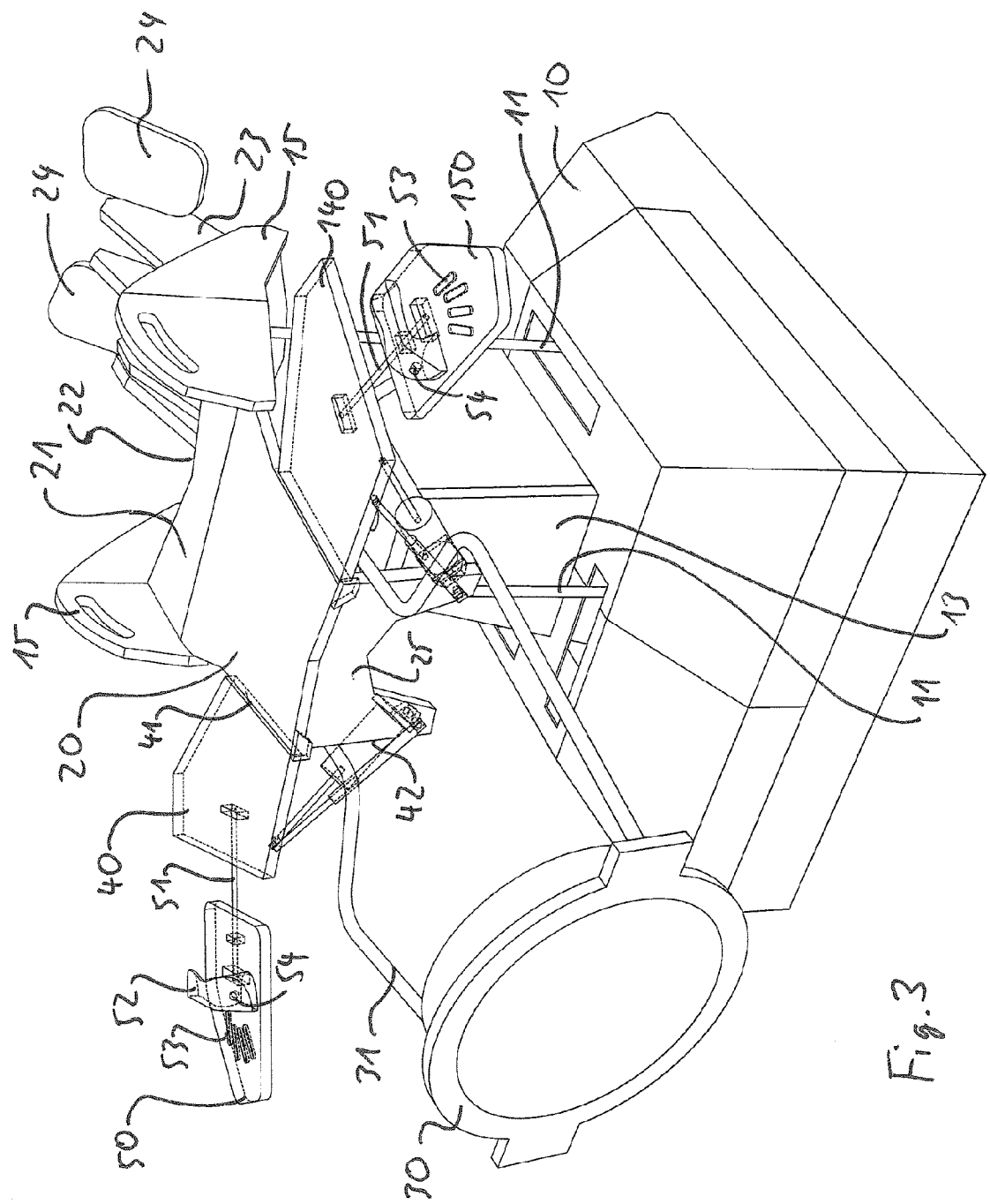
FIG. 3 shows a perspective view on the embodiment of the motion platform device according to FIG. 1.

FIG. 1, FIG. 2, FIG. 3 and FIG. 4 show a view from above, a side view, a perspective view and a front view, respectively, on an embodiment of a motion platform device according to an embodiment of the invention.

The motion platform device for flight simulation, especially for simulating the flight of a bird, comprises a base frame 10 and a moving platform 20, which is spaced apart from said base frame 10 and which has a user position surface 21 opposing to the base frame 10. A number of mounts 11, 12, 14 are connected to the base frame and connected with the moving platform 20, wherein the mounts 11, 12, 14 are adapted to allow a relative movement of the user position surface 21, especially a pivot movement around a central point in three directions, i.e. inclining forward as a bird descending and inclining backward as a bird climbing, as well as pivoting to the right and to the left as a bird turning left or right, respectively. Additionally, the motion platform device is adapted to accentuate the flapping of the wings by linear up and down movements of the moving platform in a heaving movement.

This effect is reached by means of the user lying with his chest on the center of surface 21. The thighs of the user are supported by the lower surface parts 22 which are inclined downwards compared to the essentially horizontal surface 21. The chest rest 21 is has two lateral side walls 15 to maintain the body of the user centered. The lower surface parts 22 are split by the two leg separations 23 which support a foot rest 24 each. The two leg separations 23 can end just beneath the crotch of a user lying on this bench like platform looking towards fan 30.

Fan 30 is an optional but preferred element of the device. It can be a usual round fan 30 mounted perpendicular to the connecting struts 31 directing air towards the platform 21. The struts 31 are connected with the moving platform 20 at its underside.

In an alternative embodiment, not shown in the drawings, an screen can be provided at the place of the fan 30. In an preferred embodiment the user is wearing an head mounted display (HMD) so that an image can be projected in front of his eyes even if he looks to the right or the left.

The central vertical mount 14 is hidden within the central mount 12 behind a cover of the central column 13. The central column 13 of the platform 10 is a frustoconical pyramid to allow free pivotal movement of the moving platform 20, i.e. sharp descends and sharp ascends, then the foot rests approach the central column 13.

The struts 11, 12 and 13 are usual 6-DOF robotic elements as e.g. disclosed in US 2005/0277092. The pivot point is preferably provided at the point of center of mass. Here the universal joint, which can be a spherical joint 28 is positioned at that point. It is the end point of the central strut 14 allowing at the same time to support the heaving movement as will be explained later on.

As mentioned, the mounts 11, 12, 14 are adapted to allow a relative pivotal movement of the user position surface around a spherical joint 28 (See FIG. 8), wherein the user position surface of the moving platform 20 comprises a central chest rest 21, fixedly connected in an angle of between 30 and 45 degrees with a thigh rest 22 connected with a central leg separator 24 supporting the two outer footrests 24 to position the feet of the user. The arms of the user can be positioned on the lateral wings 40, 140, 50 and 150. The two inner lateral wings 40 and 140 are pivotally connected on both sides of the chest rest 21 at joints 41. The pivot axis is oriented in each case between the lateral wings 40, 140 and the central part. The two pivots axes are converging slightly in direction of the fan 30 position.

The outer lateral wings 50 and 150 are pivotally connected with each inner lateral wing 40, 140 on its opposite side of the chest rest 21. Here, each pivotal axis is oriented along the connection rod 51, schematically shown as attached on the underside of wings 40 and 50 as well as 140 and 150. On the upper side of the outer lateral wings 50 and 150 a hand reception 52 is provided.

Figure 9A:
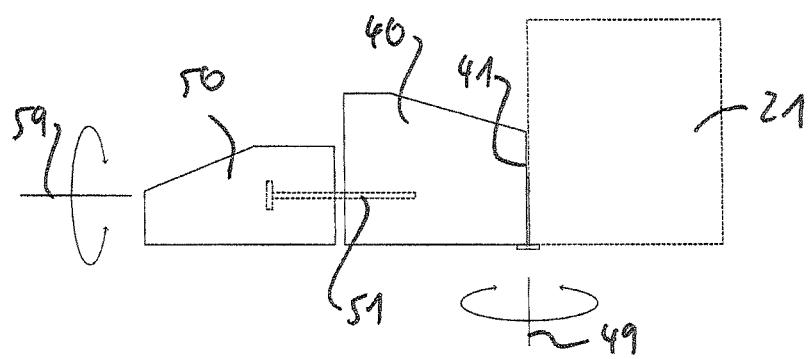
FIGS. 9A-9B show two schematical views of the pivotal axis used in the embodiment according to the invention.
Figure 9B:
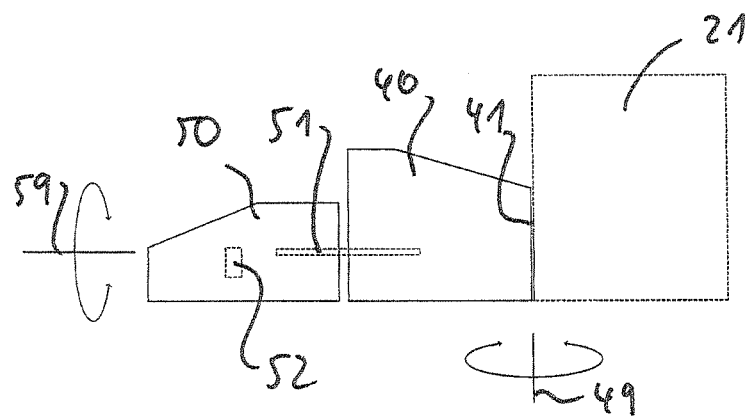

The axes 49 and 59 are shown in FIGS. 9A and 9B with two schematical views of the pivotal axis used in the embodiment according to the invention; one view from above (FIG. 9A) and one from below (FIG. 9B). Inner wing 40 turns around axis 49 up and down in view of the plan of the surface 21. Outer wing 50 turns around axis 59 in a forward/backward pivotal movement in view of the plan of the inner wing 40.

Elements 53 can provide attachment means or push buttons as explained in connection with the function of the device. Thumb push buttons 54 can be provided on the hand receptions 52.

Plunger and cylinder 42 as well as cylinder 43 are connecting by means of rods the inner wings 40 and 140 with a front mounting plate 25. The elements 42 and 43 allow capturing the active movement of the user as explained in connection with FIG. 5. They can comprise active elements but comprise in the embodiment shown only passive elements to provide force feedback onto the flapping movement of the user and to capture position signals of the inner wings 40 and 140. Element 42 can be a gas spring providing a base resistance and to place the inner wings 40, 410 in their default position. Element 43 is a passive force feedback damper to simulate the air resistance which exist when the user flaps a wing, i.e. faster movement incurs higher resistance.

FIGS. 5A, 5B and 5C show three schematical views of the inner 40, 140 and outer 50, 150 wings in a forward flying simulation movement with heave effect. Reference plane 29 is the surface of the chest rest 21 of the moving platform. FIG. 5A shows the wings 40, 140, 50, 150 in a horizontal position in line with plane 29. When the user actively "flies", then he pushes with his arms positioned on the upper surfaces of the wings 40, 140, 50, 150 and holding the hand receptions 52 downwards as shown in FIG. 5B. Here the outer wings 50, 150 can stay in line with the inner wings 40, 140. Only the downward movement is deciding. The elements 42 and 43 are shorter and detect this movement according to the double arrows 45 by integrated sensors or by calculating the position of actuators, if present. Signals provided by these sensors are transmitted to a control unit (not shown). The control unit calculates the flight effort and provides a flight vector comprising acceleration, height change, resulting velocity and position between before and after the wing beat. These values are translated in a change of the virtual representation of the view of the user on the head mounted display or another display in front of him. The head mounted display preferably shows the view of the user as if he would be a bird, i.e. with the bird's eyes. If the user has a head mounted display than if he looks right or left and the head mounted display has the usual orientation sensors, the image can show virtual wings in the actual flying movement. Said orientation sensors are usually 3-DOF, as pitch, roll and heave. The up-and-down movement of the wings 40, 140 is related to the flying effort of a bird, usually accelerating which is reflected in the position change on the display (not shown). If the fan 30 is active, then an acceleration is reflected by the control unit giving a signal to the fan 30 for an increase of the fan action and delivering more air movement.

In the present embodiment, central strut 14 is only guiding the position of the spherical joint or universal joint in its vertical dimension, but the actuation is provided by the three rods 11. Additionally the central strut 14 can be provided in a different embodiment with an actuator heaving the moving platform and especially the horizontal chest rest 20 by a predetermined amount. The amount can be such that the area between the inner 40, 140 and outer 50, 150 wings is essentially at the same height before and after the downward movement, reflecting the heave movement of the main body of the simulated bird when flying. Of course the actuation of strut 14 is accompanied by similar movements of mounts 11 and 12, so that any inclination of the moving platform is maintained at that movement.

FIG. 6A and FIG. 6B show two schematical views of the inner 40, 140 and outer 50, 150 wings in an descending flying simulation movement. The upper drawing of FIG. 6 is similar to the upper drawing of FIG. 5. The lower drawing of FIG. 6 has the user change that the outer wings 50 and 150 are both pivoted towards the front, i.e. the forward part of the outer wings 50 and 150 are lowered in comparison to the plane provided by the wing surfaces 40 and 50 as well as 140 and 150. This is equivalent—in the reality of a bird that he descends. There are sensors (not shown in most drawings and symbolized as sensors 57 in FIG. 6B) in or around the rods 51 to detect the pivotal movement of the outer wings. Preferably there are e.g. springs between the wings 40 and 50 as well as between wings 140 and 150 to bring the outer wings in the rest position if no effort is spent by the user.

When both outer wings 50 and 150 are turned as shown in FIG. 6 the user experiences a downward movement. The actuators (not shown) connected to the struts 11, 12, 14 then receive control signals from the control unit to lower the front part of the device with the fan 30 in front, thus raising the foot rests 24. In other words, the user on the surface is actively pivoted to the front, since his outer wing movement is reflected by a downward movement. At the same time, the control unit provides a downward view on the head mounted display and probably an acceleration with an increased air movement.

On the other hand, if the user is raising the front parts of the outer wings 50 and 150, then he can expect that the "bird" should rear up in an ascending movement, The control unit will then lower the foot rests 24 towards the ground, probably lower the fan action, slowing down the virtual velocity of the image representation and make the user looking more towards the sky, since the simulated bird is ascending.

Figure 7A:
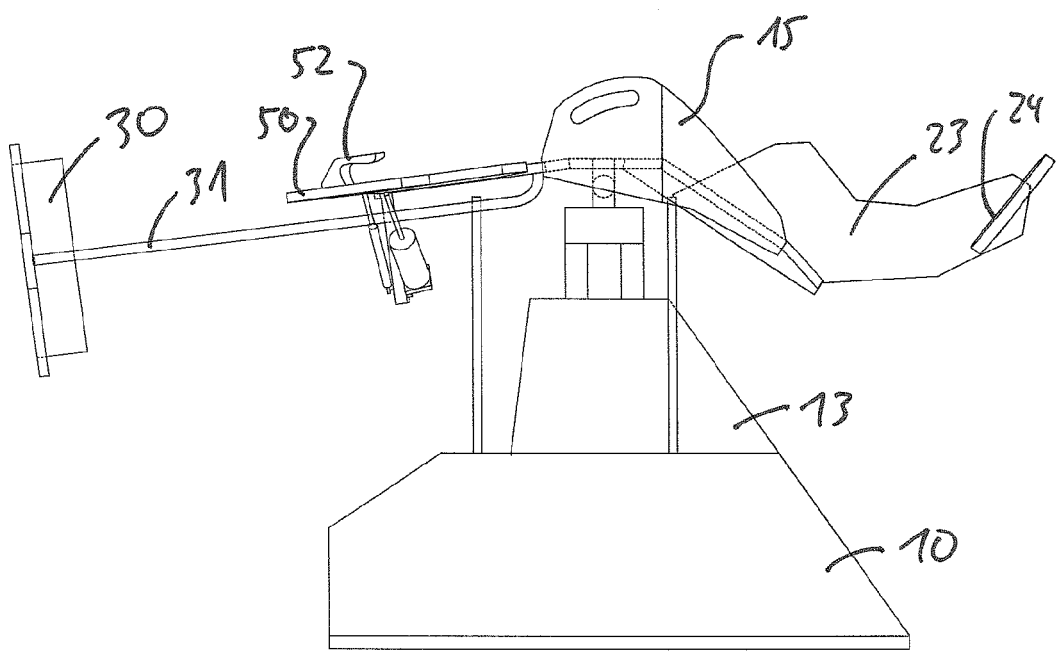
FIG. 7A-7B show two schematical views of the forward pivotal movement of the moving platform of the device according to FIG. 1
Figure 7B:
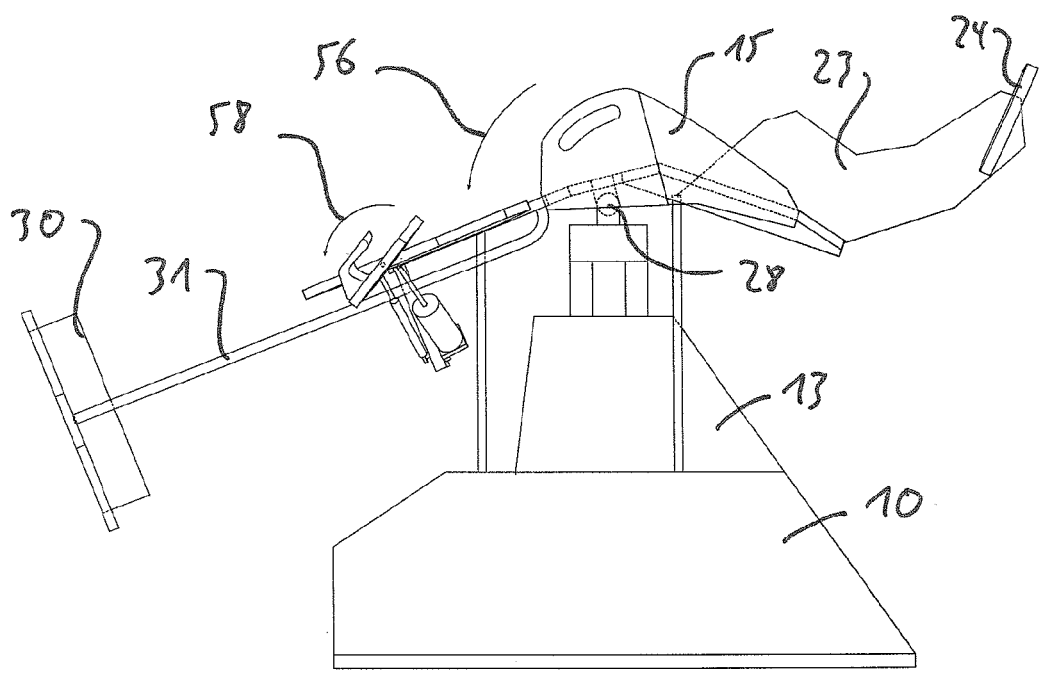

FIG. 7A and FIG. 7B show two schematical views of the forward pivotal movement of the moving platform 20 of the device according to FIG. 1. FIG. 7A represents the essentially horizontal glide position whereas FIG. 7B shows a downward directed dive of the user through pivoting both outer wings 50 and 150 forward according to forward dive arrow 58 of the outer wings 50 and 150, followed by a pivot movement of the entire moving platform 20 according to forward dive arrow 56 around spherical joint 28.

Figure 8A:
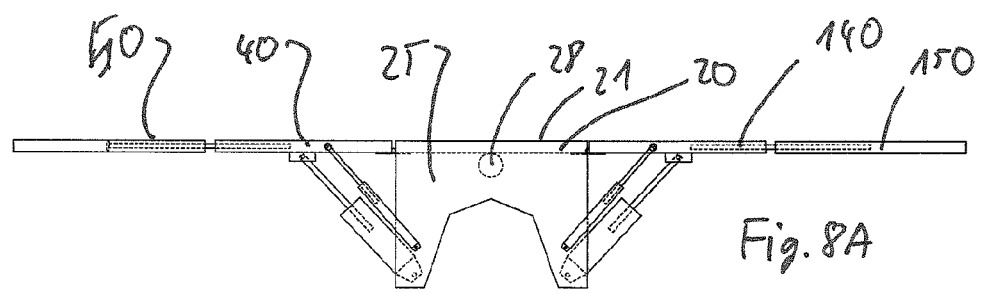
FIG. 8A-8C show three schematical views of the inner and outer wings in a turning flying simulation movement.
Figure 8B:
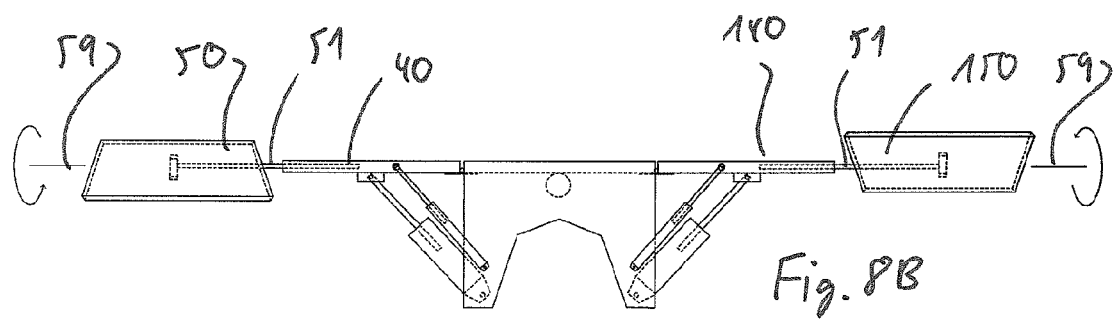
Figure 8C:
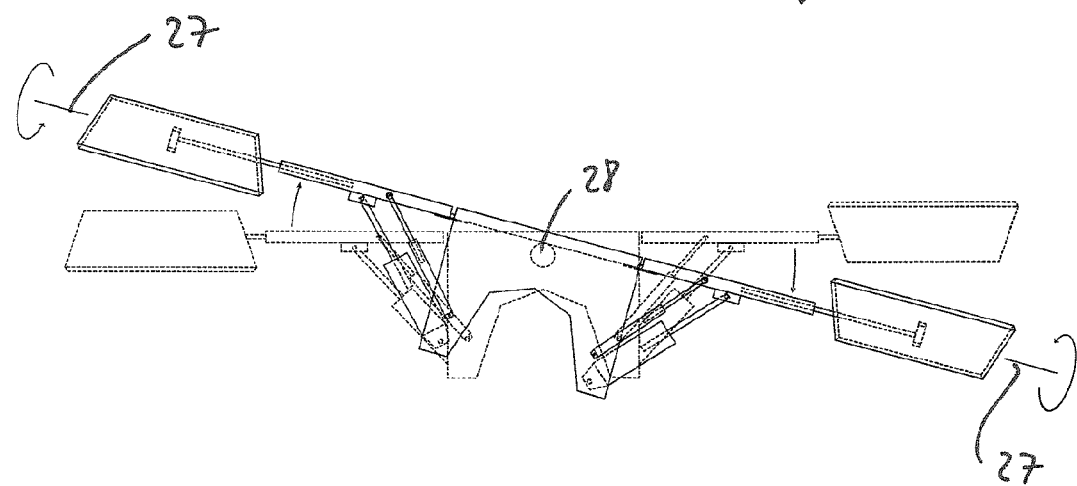

FIG. 8A, FIG. 8B and FIG. 8C show three schematical views of the inner 40, 140 and outer 50, 150 wings in a turning flying simulation movement. Starting point in FIG. 8A is identical to the maneuvers shown in connection with FIGS. 5 and 6. Here the right outer wing 50 is turned around axis 59 downward in the forward direction. At the same time, the left outer wing 150 is turned around axis 59 upward in the forward direction as shown in FIG. 8B. This is equivalent in terms of the flight of a bird that it turns left. The two turning motions are detected with sensors by the rods 51 This is reflected by the control unit receiving such sensor signals that the actuators in the base frame 10 are actuated pivoting the chest rest 23 towards the left side so that the axis 27 is inclined (while the front-back pivotal movement can be effected or not depending, if it is an ascending or descending turn) around the spherical joint 28 shown as a circle in FIG.

8C. The universal joint or spherical joint 28 is located below the trunk body of the user below the hip.

The user on the device experiences the pivotal movement and receives a different visual image (if he looks still straight in front of him) from the control unit, in that the virtual image turns left, i.e. the elements in the background are moving to the right of the screen.

Of course accelerating (active movement—to flap with the wings) and turning or rearing movements can be combined by the user as well as a change of the viewing direction (with the proviso that a head mounted display is used) at the same time allowing an immersion into the flight. Furthermore the user can receive headphones where the control unit provides sounds, either from the environment (sound of a town, nature etc.) as well as from the flight experience (e.g. wind noise or flapping of the wings). Beside a 3-DOF orientation sensor, it is also possible to mount a 6-DOF tracker at the fan to get the whole information. Tactile feedback can be obtained through actuators 61 below the palm of the user's hand. Buttons 53 can also be metal plates providing biofeedback information to the control unit.

Figure 10:
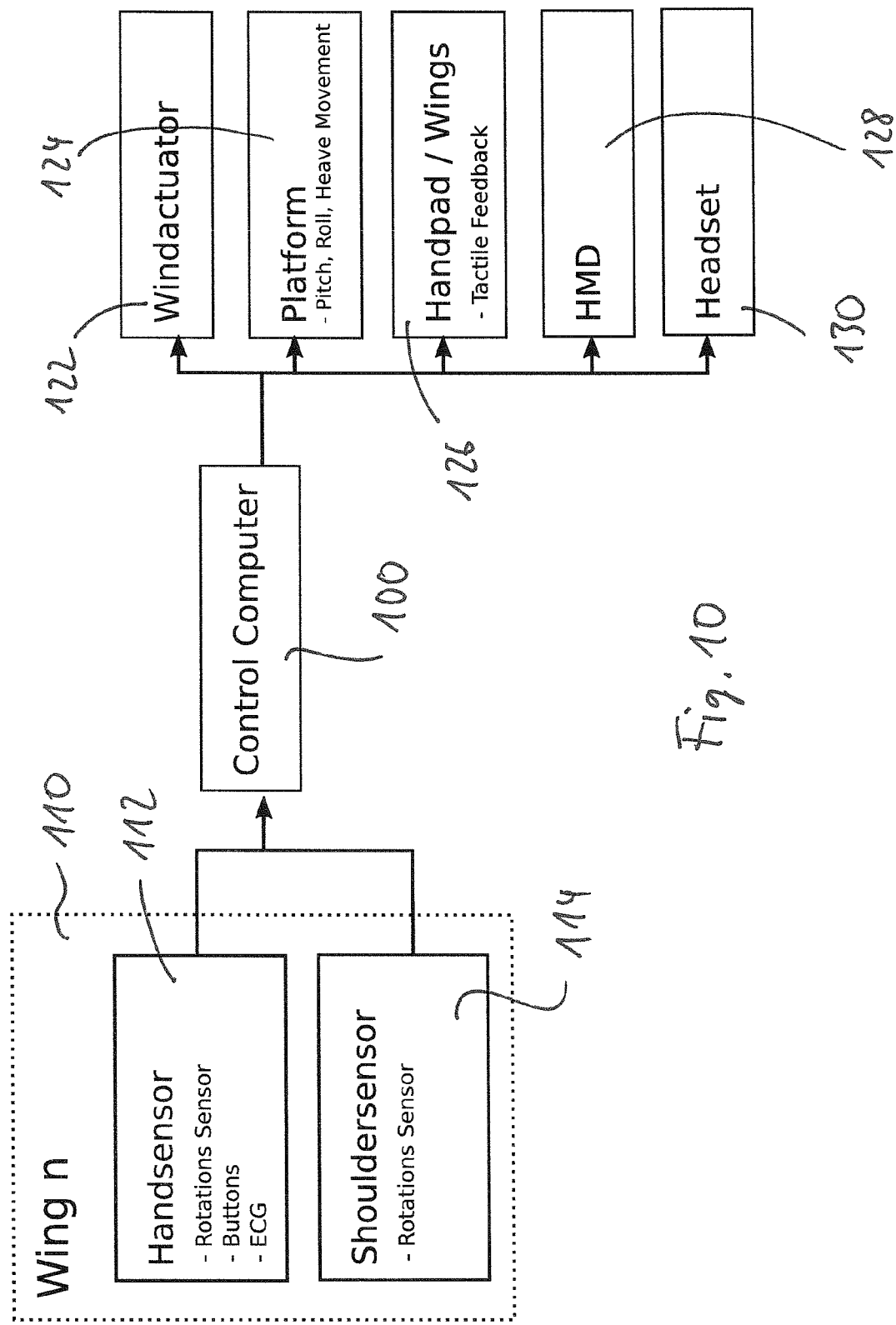
FIG. 10 shows a block diagram of the elements of a control unit to be used in connection with a device according to FIG. 1.

FIG. 10 shows a block diagram of the elements of a control unit 100 to be used in connection with a device according to FIG. 1. The control unit 100 is connected to various sensors and actuators shown as elements in FIG. 10. At the wing, referenced as 110, the shoulder sensor 114 is provided to detect the position of joint 41, either by a sensor at that place or through feedback of elements 42 and 43 as passive or active force feedback elements.

Furthermore a hand sensor unit 112 is provided at and around hand reception 52, comprising buttons and sensors (e.g. biofeedback sensors) 53, 54 at the hand as well as the outer wing position sensor 57 detecting the rotation of the outer wing.

On the other side the control unit 100 is connected to the fan 30 being controlled by a wind actuator unit 122. The moving platform 20 is controlled in view of pitch, roll and heave through struts 11, 12 and 14 actuated by actuators controlled by platform control 124. The hand pad and wing control unit 126 is e.g. provided with tactile feedback to be used by the control unit. Visual and audio feedback are provided to a user via a headset and a head mounted display, which are connected and controlled with the head mounted display control unit 128 and the headset control unit 130, which can be integrated and connected with the control unit 100 wired or wireless, e.g. by Bluetooth.

LIST OF REFERENCE SIGNS

| | |
|---|---|
| 10 | base frame |
| 11 | mount/strut |
| 12 | mount/strut |
| 13 | mount/central column |
| 14 | central mount |
| 15 | side wall |
| 20 | moving platform |
| 21 | user position surface/chest rest |
| 22 | lower surface parts/thigh rest |
| 23 | leg separation |
| 24 | foot rest |
| 25 | front mounting plate |
| 26 | lateral guide |
| 27 | inclined axis |
| 28 | spherical joint/universal joint |
| 29 | reference plane |
| 30 | fan |

-continued

LIST OF REFERENCE SIGNS

| | |
|---|---|
| 31 | connecting strut |
| 40, 140 | lateral inner wing |
| 41 | joint |
| 42 | plunger and cylinder |
| 45 | double arrow for flapping |
| 46 | double arrow for heave |
| 49 | pivot axis |
| 50, 150 | lateral outer wing |
| 51 | connection rod |
| 52 | hand reception |
| 53 | actuating/holding elements |
| 54 | thumb push button |
| 55 | double arrow |
| 56 | forward dive arrow |
| 57 | sensors |
| 58 | forward dive arrow |
| 59 | pivot axis |
| 61 | tactile feedback actuator |
| 100 | control unit |
| 110 | wing |
| 112 | hand sensor |
| 114 | shoulder sensor |
| 122 | wind actuator |
| 124 | platform control |
| 126 | hand feedback |
| 128 | display control |
| 130 | head set |

The invention claimed is:

1. A motion platform device for flight simulation, comprising: a base frame, a moving platform, which is spaced apart from said base frame and which has a user position surface opposing to the base frame, and a number of mounts connected to the base frame and connected with the moving platform, wherein the mounts are adapted to allow a relative pivotal movement of the user position surface around a central point, wherein the user position surface of the moving platform comprises a central chest rest, fixedly connected with an angle with a thigh rest connected with a central leg separator supporting two outer footrests to position the feet of the user, wherein two inner lateral wings are pivotally connected on both sides of the chest rest, wherein an outer lateral wing is pivotally connected with each inner lateral wing on its opposite side of the chest rest, wherein each outer lateral wing comprises a hand reception on its upper side.

2. The platform device according to claim 1, further comprising a fan, attached at and in front of the moving platform and adapted to direct a stream of air towards the head of a user positioned on the moving platform.

3. The platform device according to claim 1, wherein the outer lateral wings further comprise one or more actuation buttons for the thumb and/or the fingers of the hand of a user on the outer wing surface or at the hand reception, respectively.

4. The platform device according to claim 1, wherein the pivot axes between the inner wings and the chest rest are oriented in or near the plane of the chest rest, wherein the pivot axes between the outer wings and the inner wings are oriented perpendicular to the respective pivot axes between the inner wings and the chest rest.

5. The platform device according to claim 1, wherein the mounts are connected to actuators adapted to pivot the moving platform around a spherical joint provided under the chest rest between the chest rest and the thigh rest.

6. The platform device according to claim 1, wherein inner wings and the respective outer wings are connected with a resetting spring or resetting actuator, bringing the upper surfaces of the inner and outer wings in flush alignment, if no external force is acting on the pivotal joint.

7. The platform device according to claim 1, wherein inner wings and the chest rest are connected with a resetting spring or resetting actuator, bringing the upper surfaces of the inner wings and the chest rest in flush alignment, if no external force is acting on the pivotal joint.

8. The platform device according to claim 1, wherein first sensors are provided between the inner wings and the chest rest detecting the relative pivotal position between the respective inner wings and the chest rest, wherein second sensors are provided between the inner wings and the connected outer wings detecting the relative pivotal position between the respective inner wings and outer wings, and wherein third sensors are provided between the base frame and the moving platform detecting the relative pivotal position between the base frame and the moving platform.

9. The platform device according to claim 8, further comprising an electronic control unit adapted to receive sensor signals from said first second and third sensors to determine the position of the different part of the moving platform above the base frame, further adapted to calculate the position of the moving platform in a virtual environment and generating a virtual image to be represented on a screen of a display to be seen or worn by a user.

10. The platform device according to claim 9, wherein sensor signals from a pivotal movement of one or both outer wings in relation to the respective inner wings, and wherein sensor signals from the pivotal movement of the inner wings in relation to the chest rest is used by the control unit to change acceleration, orientation and position of the simulated flight through change of the virtual represented image and determining the corrected orientation and position of the moving platform through actuating the actuators.

\* \* \* \* \*